April 14, 1942.  E. W. MILLER  2,280,045
GEAR FINISHING MACHINE
Filed June 19, 1936   6 Sheets-Sheet 4

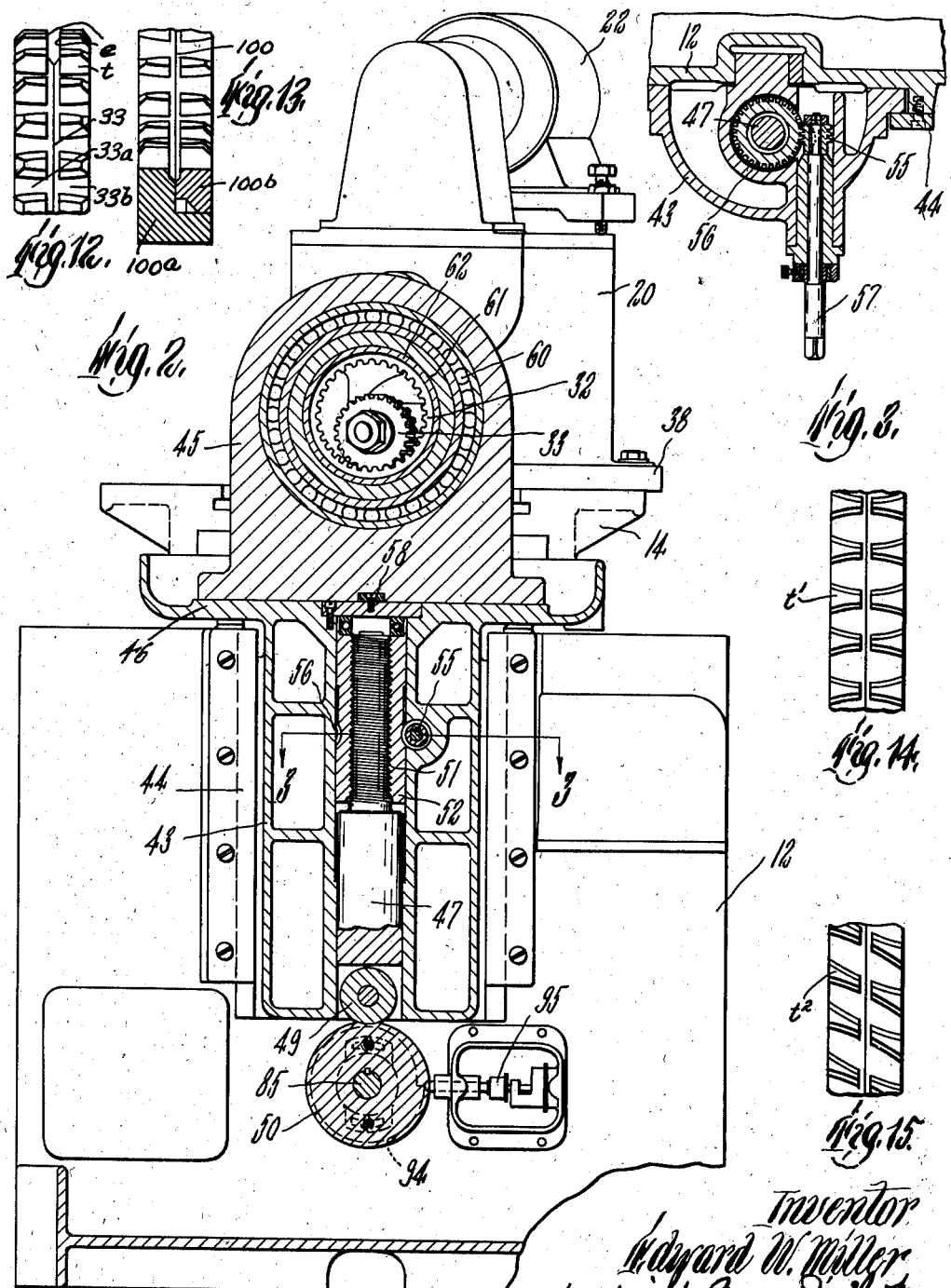

Inventor
Edward W. Miller

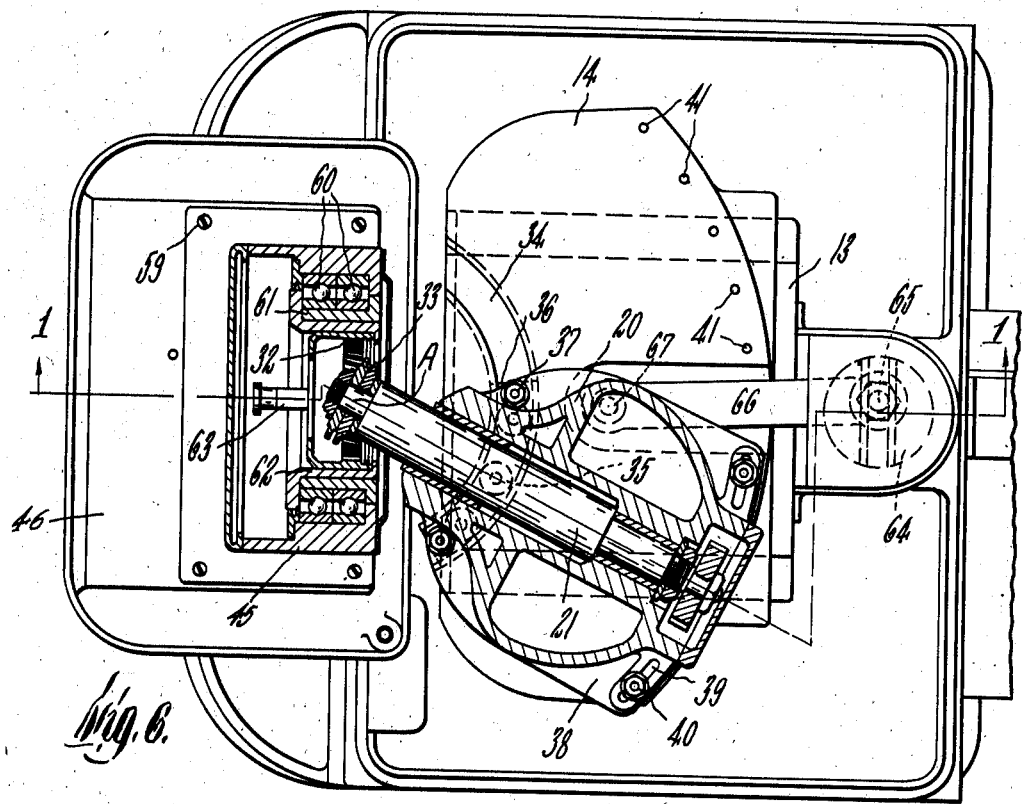
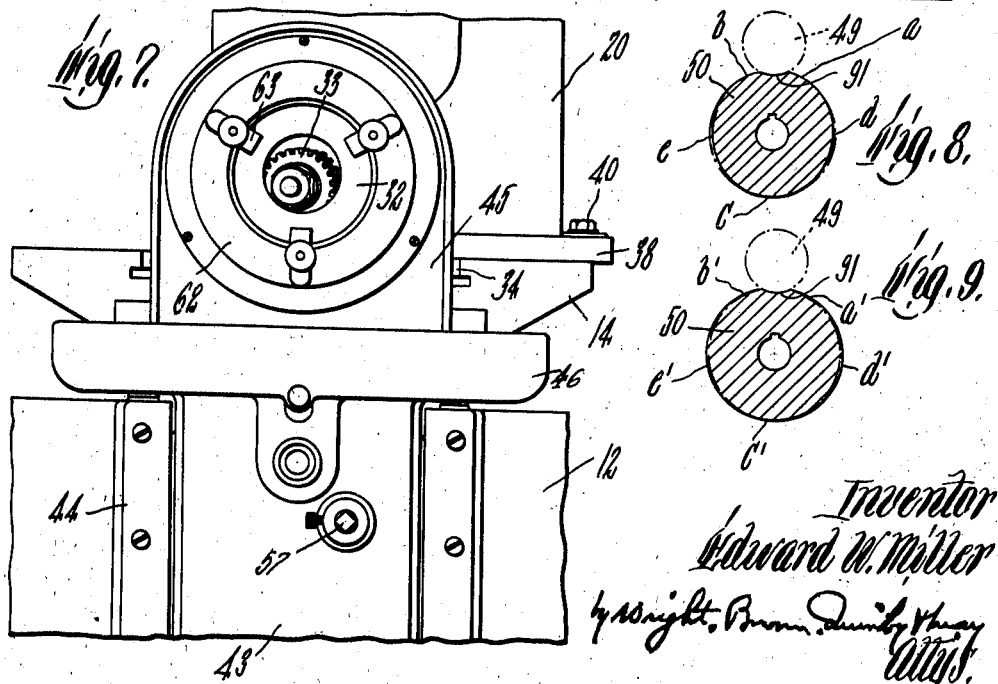

Patented Apr. 14, 1942

2,280,045

UNITED STATES PATENT OFFICE 2,280,045

GEAR FINISHING MACHINE

Edward W. Miller, Springfield, Vt., assignor to The Fellows Gear Shaper Company, Springfield, Vt., a corporation of Vermont Application June 19, 1936, Serial No. 86,089

20 Claims. (Cl. 90—1.6)

The present invention relates to machines for finishing gears with the aid of a tool having teeth of conjugate form to the teeth of the work gear, and by which relative motions between the tool and work gear are effected, compounded of rotation in mesh with one another and relative reciprocation in the direction of the axis of the work gear. It is my present object to provide a machine of this character having means for mounting and operating such a tool and work gear in association with one another. A further object is to provide means for adapting such a machine to a wide variety of uses, such as that of finishing either external or internal gears by a tool having external teeth, or an external gear by a tool with internal teeth; and to finish helical gears, either external or internal, by a tool having either straight or helical teeth, or straight toothed gears by a helical tool.

The invention comprehends the means and combinations of elements hereinafter described, for carrying such objects into effect, together with all novel principles thereof and all equivalent structures containing such principles, within the scope of the appended claims as construed in the light of the prior art. This application is a continuation in part of the patent application filed by me November 19, 1935, Serial No. 50,573, entitled Method and means for finishing gears, on which Letters Patent No. 2,228,965 were granted January 14, 1941, and includes a number of improvements and useful features additional to the matters disclosed in said application.

A specific commercial machine embodying the principles for which I seek protection is described in the following specification and shown in the drawings, in which Fig. 1 is a vertical section of the machine taken through the axes of the tool spindle and the work piece on the line I—I of Fig. 6;

Fig. 2 is in part a front elevation and in part a vertical section taken on line 2—2 of Fig. 1;

Fig. 3 is a detail cross section taken on line 3—3 of Fig. 2;

Fig. 6 is a horizontal section on line 6—6 of Fig. 1 and a plan view of the parts below the plane of section;

Fig. 7 is a front elevation of the work holder and adjacent parts of the machine;

Fig. 8 is a detail view in section of a cam by which the work holder is operated, shown with exaggeration of its characteristics;

Fig. 9 is a similar view of a modified form of cam for the same purpose;

Fig. 12 is a partial side elevation of a tool forming part of the machine combination adapted to finish internal helical gears;

Fig. 13 is a partial section of an equivalent tool having internal teeth adapted to finish external helical gears;

Fig. 14 is a fragmentary elevation of an external tool for finishing external helical gears;

Fig. 15 is a fragmentary elevation of an external helical tool adapted to finish spur gears.

Like reference characters designate the same parts wherever they occur in all the figures.

Figure 1:
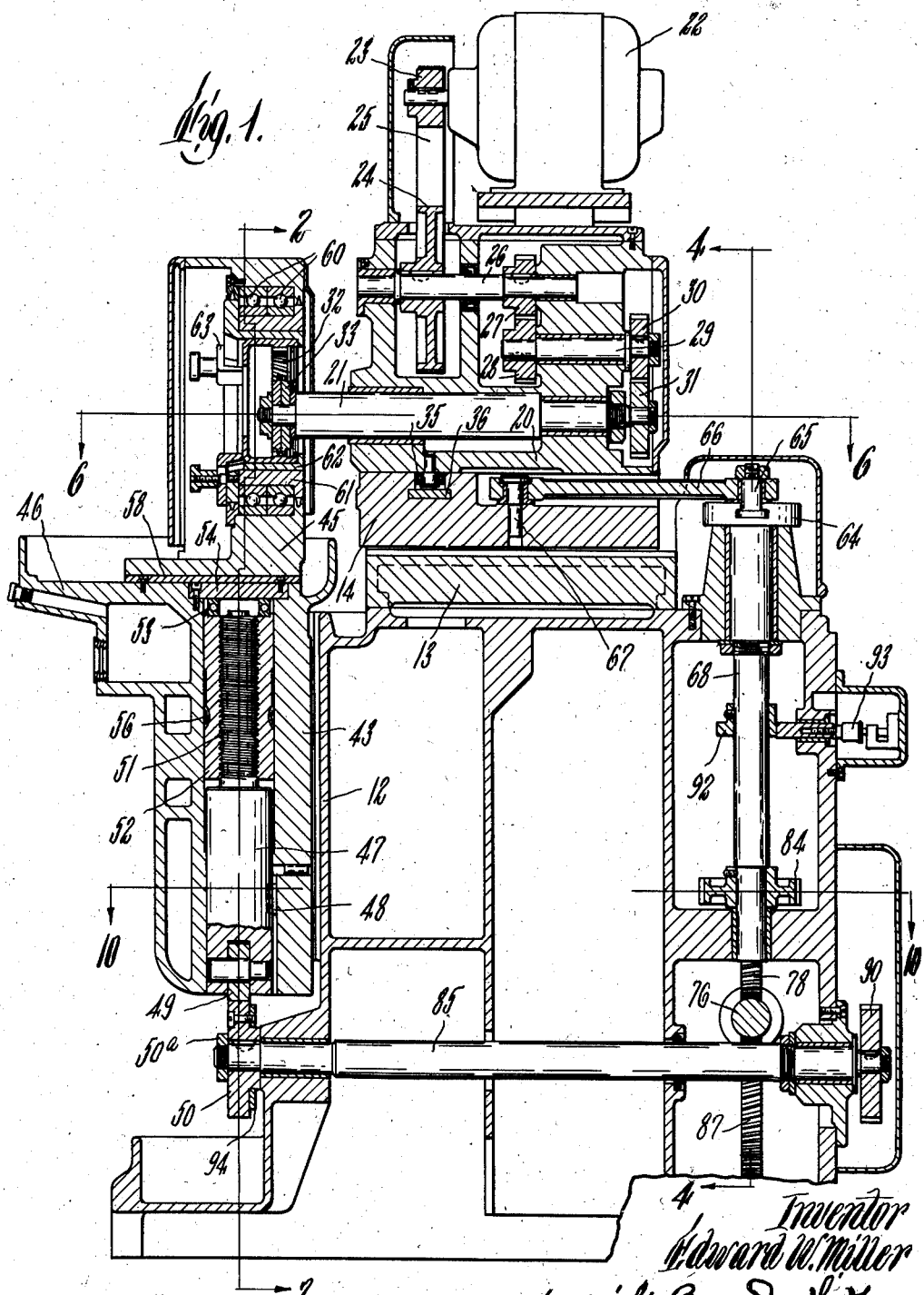
Figure 4:
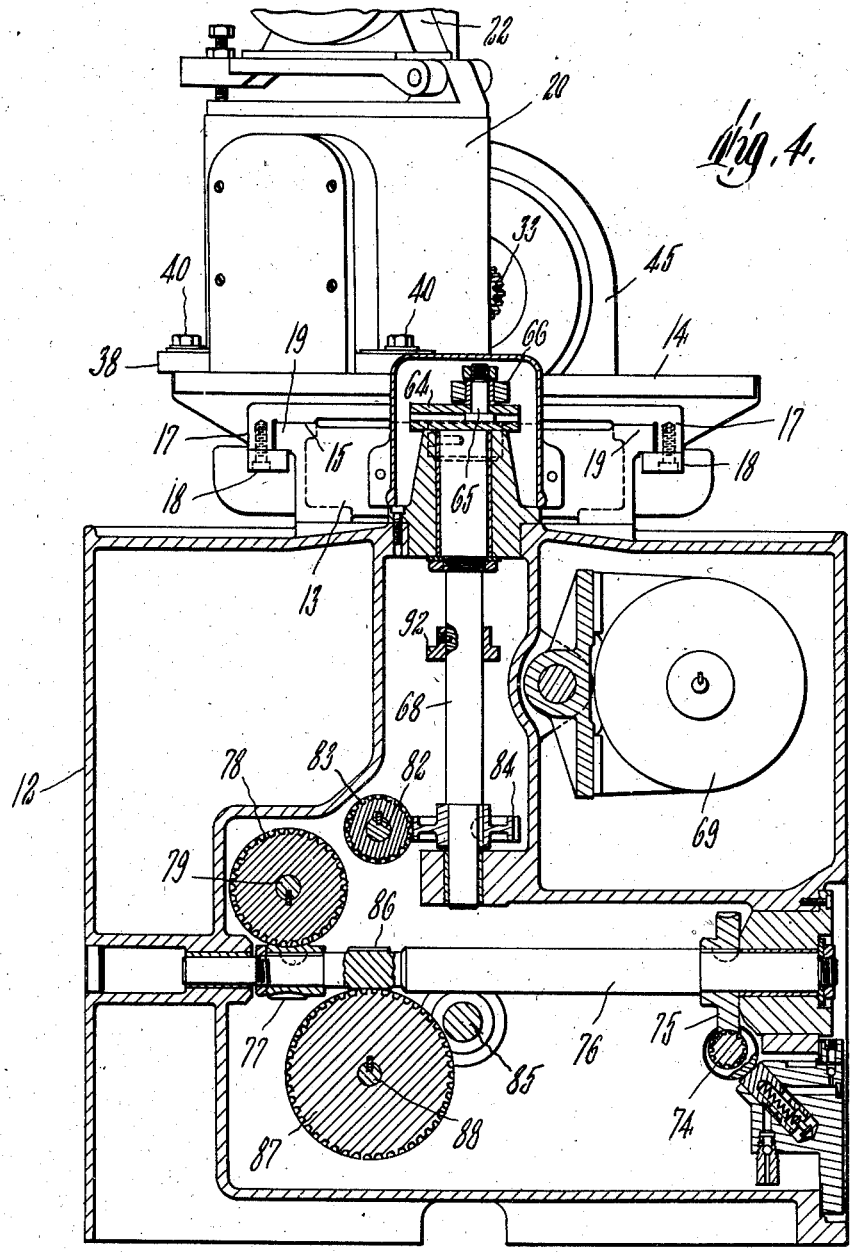
Fig. 4 is a vertical section taken on line 4—4 of Fig. 1 and a rear elevation of the upper part of the machine.
Figure 5:
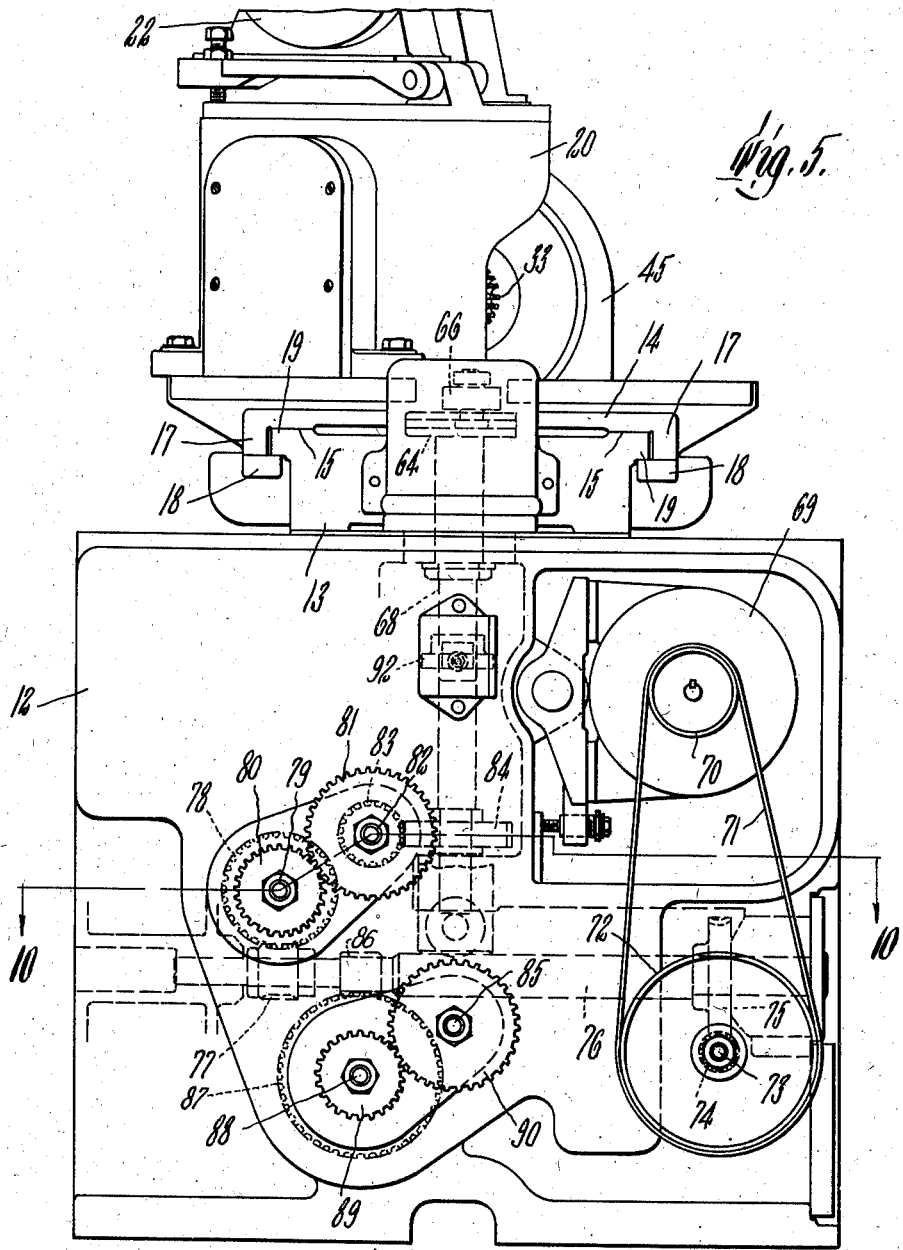
Fig. 5 is a rear elevation of the entire machine.
Figure 10:
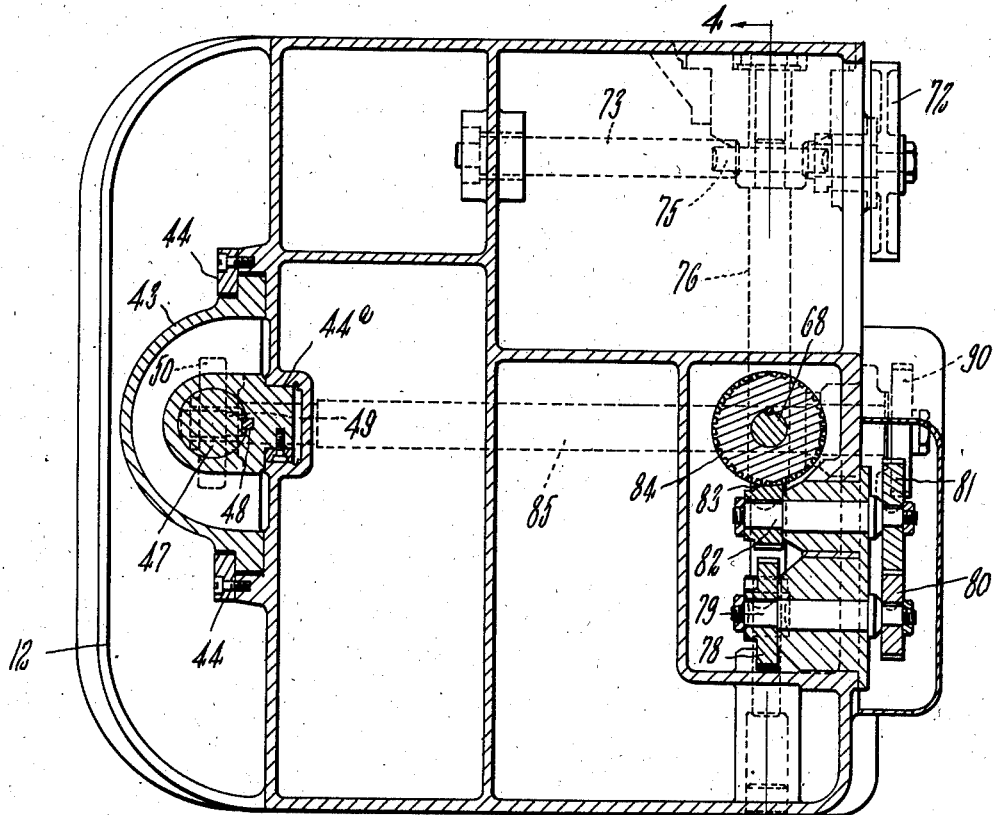
Fig. 10 is a cross section of the machine taken on line 10—10 of Fig. 1.

The machine structure comprises a base or pedestal 12, on the top of which is secured a guide block 13 supporting a sliding carriage 14. The carriage rests on guideways 15 of the guide block 13 and has flanges 17 and gibs 18 embracing ledges 19 on the opposite sides of the guide block. There is secured adjustably, with provision for angular adjustment, on the carriage 14, a holder 20 in which a spindle 21 is rotatably mounted. For convenience in the present description the spindle 21 will be called the tool spindle, although it will presently be shown that the same spindle may carry a work gear instead of a tool; and for the same reason the holder 20 will be called the tool holder and the carriage 14 the tool carriage. On the top of the holder 20 is mounted an electric motor 22 which drives the spindle 21 through pulleys or sprockets 23, 24, and a belt or chain 25, shaft 26, gears 27, 28, shaft 29, arranged as shown in Fig. 1, and change gears 30 and 31 on the last named shaft and on the tool spindle respectively. The specific drive thus shown typifies any driving means suitable for the purpose and is not to be construed as a limitation of the invention in that respect.

The machine as set up in Figs. 1-10 inclusive is organized to finish an internal helical gear 32 by the cutting and burnishing action of a gear-like tool 33 operated in mesh with the work gear and with its axis askew to that of the work gear. The tool represented in these figures, and shown on a larger scale in Fig. 12, is an embodiment of the tool described and claimed in my patent application filed April 16, 1936, Serial No. 74,614, entitled Gear finishing tool, on which Letters Patent No. 2,228,966 were granted January 14, 1941. It consists of two units 33a and 33b secured to the end of the tool spindle, having teeth t of form and dimensions conjugate to the work gear teeth, made of any suitable metal cutting tool material, with cutting edges e on the ends of the teeth next to the adjacent unit and smooth faces on the sides of the teeth. The side faces of the teeth are longitudinally convex on both sides, as shown in Fig. 12 (with exaggeration for clarity), in order to permit the cutting edges and the areas of the side faces adjacent thereto to engage the teeth of the work gear, as fully explained in my prior applications. Such teeth may be either parallel to the axis of the tool and spindle, or helical with a different helix angle than that of the work gear teeth. But other tools may be used here if desired, including those which lap or burnish only as well as tools like those of my preceding application.

The spindle holder 20 is adjustable angularly in a horizontal plane about a vertical axis A (Figs. 6 and 11) in front of the sliding carriage 14, and the spindle 21 protrudes from the holder perpendicular to and in axial intersection with the axis A; and it is suitably constructed to mount the tool units symmetrically at opposite sides of the axis A, wherefore angular adjustments of the holder change only the angular relationship of the tool, and not its position with respect to the path of its travel. An undercut groove 34 of arcuate curvature, concentric with axis A, is provided in the upper side of the carriage 14, and the holder is equipped with guide rolls 35 projecting from its under side which bear on the opposite edges of this groove, as shown in Fig. 1, and with clamps 36 underlapping the sides of the groove, equipped with screws and nuts 37 for securing the holder in place. Additional securing means are afforded by the slotted flanges 38 at opposite sides of the rear part of the holder, in which the slots 39 are also concentric to the axis A, and through which pass clamping bolts 40 screwed into holes in the carriage. Provision of a sufficient number of such holes, some of which are shown at 41 in Fig. 6, together with a suitable length of the slots 39, enables the spindle 21 to be set either parallel to the path of movement of the carriage or at any angle within a wide range to either side of such parallel position.

The work support (so called for present convenience although, as will presently appear, it may serve also as a tool support), comprises a slide 43 vertically movable in guideways 44 on the forward side of the base, and a holder 45 secured to the upper end of said slide. Different holders may be substituted for one another, for which purpose the slide is provided with a wide table-like portion 46 at its upper end adapted to receive work or tool holders of different kinds in different positions. The slide is adapted to be adjusted vertically to accommodate such different holders, and the work pieces or tools carried thereby, to the spindle 21; and in the operation of the machine the slide is also raised and lowered automatically. It is equipped with a plunger 47 located and slidable longitudinally in a passageway in its interior and withheld from rotation by a key 48. The lower end of such plunger carries a cam follower roll 49 engaging a cam 50 by which the automatic rise and descent of the slide in prescribed timing with the other functions of the machine is effected; said cam serving also as a rigid abutment supporting the slide and maintaining any prescribed distance, fixed or variable as may be desired, between the axes of tool and work during the traversing movement of the carriage. The upper portion of the plunger 47 is made as a screw 51 of reduced diameter engaged with an adjusting nut 52 which is fitted rotatably in the passageway and supports the slide through a thrust bearing 53 and a cover plate or block 54 secured to the upper end of the slide across the passageway. Rotation of the nut to adjust the slide up or down is effected manually by a worm or helical gear 55 meshing with a series of worm gear teeth 56 on the nut and secured to a shaft 57 which is rotatably mounted in, and protrudes from the front of, the slide and may be rotated by a wrench.

The work holder 45 shown in Figs. 1, 2, 6 and 7 is designed to support rotatably an internal helical gear. Its base rests on the table 46, whereon it is positioned by a rib 58 (secured to the table top) and made fast by screws 59 entering tapped holes in the table. The upright portion of the support has a circular aperture in which is supported rotatably (by ballbearings 60 or in any other suitable manner) an annular carrier 61 in which the work piece 32 is secured by an adapter 62 and clamps 63. The specific character of the work carrier, gripping means and support here shown is of minor importance, inasmuch as many different designs of work supporting means may be used adapted to hold work pieces of different kinds and dimensions.

In the operation of the machine, the carriage 14 is reciprocated in the path to which it is constrained by the guide block 13, such path, and the position of the work support, being so related as to cause traverse of the tool 33 across the face of the work gear in parallel with the rotational axis of the latter. It may be noted further that the work holder is so placed as to bring a diametral plane of the work piece into coincidence with the axis A, and to cause mesh of the tool and work gear to occur in this plane. The mechanism for thus reciprocating the carriage comprises a crank disk 64 carrying a radially adjustable crank pin 65, which may be located in the axis of the disk, or at any point between such axis and either end of the diametral slot in the disk, and a connecting rod 66 coupled to the carriage by a wrist pin 67 (Fig. 1). The crank disk is secured to the upper end of an upright shaft 68 which is driven by an electric motor 69 (Fig. 5) through a belt and pulley drive 70, 71, 72, shaft 73, worm and wheel drive 74, 75, shaft 76 (Fig. 4), worm and wheel drive 77, 78, shaft 79, change gears 80, 81, shaft 82 and worm and wheel drive 83, 84, the last element of which is keyed to shaft 68. Within the meaning of the "the worm and wheel" applied to the gears here described are included equivalent helical gear pairs, either member of which may be a throated gear. This train is designed to reciprocate the carriage at a relatively slow rate while the spindle 21 is driven at high speed.

The cam 50 which controls the rise and descent of slide 43 is rotated in time with the crank shaft 68 at a suitable speed ratio. It is keyed to a shaft 85 which is driven from shaft 76 by a worm and wheel drive 86, 87 (or equivalent helical gears), shaft 88 and change gears 89 and 90 secured to the shafts 88 and 85 respectively. The cam permits a separation of the work from the tool radially of the latter when the tool is at one limit of its traversing movement, wherefore it is formed with a depression 91 which is located to receive the follower roll 49 when the tool is withdrawn, i. e., when the crank pin 65 is at its rear dead point. The cam surface at the side of the depression which advances when the machine starts is designed to effect a quick rise of the slide and feeding of the work into full depth of mesh with the tool. At the end of one rotation, during which the tool has traveled forward and back, the follower enters the depression and permits withdrawal of the work.

This cam is located outside of the adjacent wall of the base where it is accessible for removal and substitution of equivalent cams having specific characteristics for definite purposes. Such substitutions are readily made by removing the nut 50a shown in Fig. 1 and slipping the cams off and on the protruding end of the shaft. Such cams may have an important function in addition to that of feeding to depth and separating the work from the tool; namely, of giving a crowning formation to the teeth of the work piece. Such crowning formation may consist of greater thickness in the longitudinal middle portions of the work piece teeth than at their ends, in which case the side faces of the teeth are longitudinally convex; or it may consist in making the teeth narrower in mid length than at the ends, with longitudinal concavity in their side faces. The bowed curvatures thus produced in the work gear teeth are essentially like those of the tool teeth explained in my before mentioned prior applications Serial No. 50,573 and Serial No. 74,614. They enable gears which are meshed together with their axes askew to one another to have an extended bearing lengthwise, which may continue throughout the entire overlapping length of the meshing gear teeth or may be any desired fraction of such overlapping length depending on the degree of longitudinal convex curvature. Internal-external skew gear couples have such extended bearing when the teeth of either member of the couple are longitudinally convex on both sides; while the same character of bearing is obtained between two external gears in skewed mesh when the teeth of either are made concave longitudinally on both faces. Bowed formations of this general nature are useful for other purposes also.

Such a convex formation is obtained with the aid of the embodiment of cam 50 shown in Fig. 8. Such cam is provided with high dwells $a$ and $b$ of equal radius, beside the notch 91, another high dwell $c$ of the same radius at the opposite side of the cam, and intermediate arcs $d$ and $e$ of progressively and symmetrically decreasing and increasing radius, located oppositely to one another. By this cam the work carriage is caused to descend and rise gradually in the course of each stroke of the tool, and is held at its highest point at the ends of the stroke. Thus the depth of cut made by the tool is greatest at the ends of the work gear teeth and is gradually of less depth from each end to the middle. To obtain the concave bowed effect, a cam embodiment such as that shown in Fig. 9 is used, which has low dwells $a'$, $b'$ at one side of its center and $c'$ at the opposite side of equal radius, and intermediate eccentric segments $d'$ and $e'$ of gradually increasing and decreasing radii, by which the work is raised toward the middle of each stroke of the tool and lowered as the tool approaches the ends of the strokes. According as greater or less longitudinal curvature is desired, or the locations of the greatest and least depths of cut are desired in other parts of the gear teeth, the character and location of the cam rises and descents are appropriately varied. If uniform tooth thickness is required a cam of uniform radius, except at the depression 91, is used.

The cycle of this machine, in the course of which it completes the finishing operation on a gear, is designed to consist of one reciprocation forward and back of the tool, and one rotation of the cam 50. Means are provided for stopping the motors 22 and 69 at the end of each cycle, consisting of a cam 92 on the shaft 68 controlling the motor 22 through a switch mechanism 93, and a cam disk 94 secured adjustably to the cam 50 for controlling the motor 69 through a switch mechanism 95. These are control devices of conventional character, and the machine may be started by other suitable control means of known type which need no illustration.

I have explained in my prior application Serial No. 50,573 (Patent 2,228,965) that finishing operations such as this machine is designed to effect may be carried out on either external or internal gears by an externally toothed tool; and may also be performed on external gears by an internally toothed tool. It is part of the invention to make the machine adjustable or convertible so as to carry out all of such operations. The means to this end comprise provisions for substituting not only different external tools for the tool 33, but also for the substitution of an external work gear on the spindle 21, and the substitution of other holders for the work holder 45 adapted to mount work gears, either internal or external, of different dimensions; and also to mount an internally toothed tool in position to mesh with a work gear on the spindle 21, at a skew angle, when the spindle is adjusted into parallelism with the path of movement of the carriage 14. When work of the character herein discussed is performed with distribution of the cutting effect by relative translation between the tool and work, it is essential that such translation take place in a line parallel to the axis of the work. Hence when the work piece is mounted on the slide 43, it is arranged with its axis parallel to the path of the carriage 14; and when the tool is mounted on slide 43 and the work piece on spindle 21, the holder 20 is adjusted to bring the spindle parallel with such path of movement.

Figure 11:
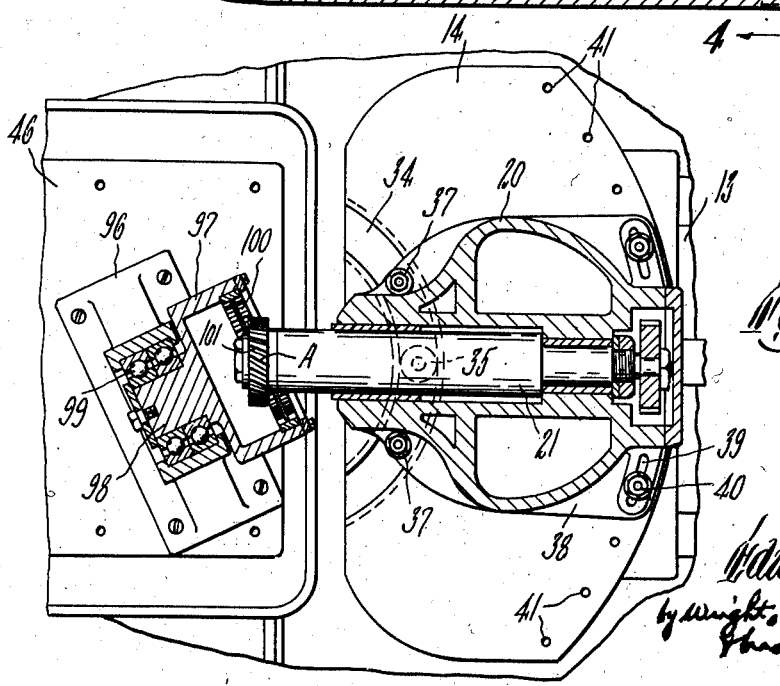
Fig. 11 is a fragmentary horizontal section and plan view similar to Fig. 6 but showing an adjustment of the machine for a specifically different character of work.

Fig. 11 shows one such substitution consisting of a holder 96 and a carrier 97 having a shaft extension 98 which is rotatably contained in a bearing 99 in the holder. An internally toothed tool 100 is secured coaxially in the carrier and is provided with cutting edges and rubbing faces on its teeth of the character described in the prior patents referred to. Said tool is shown on a larger scale in Fig. 13. Like the tool shown in Fig. 12, it is made of two units 100a and 100b each having teeth with convex side faces alined with the teeth of the other section and having cutting edges on their inner ends. Although the teeth here shown are parallel to the axis of the tool, they may be arranged helically for finishing spur gears or helical external gears of different helix angle than the tool. A work piece 101 is mounted on the spindle 21 in place of the tool 33, the spindle holder is adjusted to bring the axis of spindle 21 into parallelism with the path of its reciprocation, and the holder 96 is made fast to the table 46 in a position which brings the tool and gear into mesh at a skew angle equal to the helix angle of the teeth of this work piece and with the common perpendicular to the axes of the tool and work piece in a position intermediate the ends of the tool, and also between the ends of the work piece 101 when the spindle carriage 14 is at or near mid stroke. Such common perpendicular is located at A in Fig. 11 (as also in Fig. 6) and coincides with the axis of angular adjustment of holder 20 when the carriage or slide 14 is in the position there shown. In all other positions of the carriage the said common perpendicular and axis of adjustment are parallel to one another.

The characteristics of tools adapted for finishing external gears are shown in Figs. 14 and 15. They are substantially like the tools for finishing internal gears except that their teeth $t'$ and $t^2$ have concave instead of convex side faces, whereby extended lengthwise contact may be made with the teeth of the work gear. The teeth $t^2$ of the tool shown in Fig. 15 differ from the teeth $t'$ shown in Fig. 4 in that they are helical instead of in an arrangement similar to spur gears.

In all forms of tool embodying the bowed face curvature, whether convex or concave, the curves of alined teeth of the assembled units are continuation curves. That is, in the convex form, the least thickness of the teeth is at the ends of the tool and their thickness increases inwardly from the ends; while in the concave form, the greatest thickness is at the ends and the thickness diminishes inwardly from the ends.

The illustrations herein show two of the many different work or tool holders which may be used with this machine and two of the many positions in which such holders may be located. In these illustrations the holders are fastened to the table of the upright slide by screws. They may be thus secured in any position suitable to bring straight toothed tools (i. e., tools in which the teeth are parallel to the axis) into mesh with conjugate helical work gears of any helix angle, or helical tools into mesh with straight toothed work gears or with helical work gears of different helix angles from the tools, whether the tools or the work gears have external or internal teeth; while the capacity for adjustment of the slide 43 permits tools and work gears of different diameters to be thus brought into mesh. In commercial practice machines of the design here illustrated are provided with a number of holders like or analogous to the holders 45 and 96, and tapped holes are cut in the table 46 in locations suitable for correctly positioning such holders. It is within my contemplation, however, to provide the slide 43 with guide means corresponding to those of the carriage 14 and holder 20, or with a turn table adjustable to any angle about a vertical axis, or other suitable equivalent means whereby different holders or carriers may be adjusted to any position required for the mesh of different tools and work pieces in the manner described.

I wish to make it plainly understood that the descriptive terms used in the foregoing specification and the appended claims which define the relations of the parts of the machine with respect to the horizontal and vertical, are not intended to have any limiting effect. These terms are convenient for clear and concise description, and are used only for that purpose. So far as the principles which I claim are concerned, the machine and its parts may be disposed in any relation to the horizon provided correlation between the parts equivalent to the foregoing description is maintained. The arrangement of the spindle carriage to move horizontally is of advantage because the effect of its weight is equal on its movements in both directions; and the vertical or upright arrangement of the slide 43 is of advantage because it enables gravity to move this slide in one direction; but these are not essential or controlling features and it would be no departure from the invention to provide mechanical means for retracting the slide in other arrangements.

What I claim and desire to secure by Letters Patent is:

1. A machine for finishing gears by the action of a conjugate gear-like tool running in mesh therewith when the axes of said gear and tool are non-parallel and non-intersecting, comprising a reciprocatable carriage, a spindle holder on said carriage, a spindle rotatably mounted in said holder and protruding therefrom having provisions for mounting coaxially such tool or work gear, a slide mounted with capacity for moving in a path transverse to that of said carriage, and a work holder supported on said slide and adapted to support rotatably a gear element in mesh with a gear element on said spindle, said spindle holder being mounted with provision for angular adjustment on the carriage about an axis perpendicular to the axis of the spindle and to the path of reciprocation of the carriage.

2. A machine for finishing gears by the action of a conjugate gear-like tool running in mesh therewith when the axes of said gear and tool are non-parallel and non-intersecting, comprising a reciprocatable carriage, means for limiting the reciprocations of the carriage to a given path, a spindle holder on said carriage, a spindle rotatably mounted in said holder and protruding therefrom having provisions for mounting coaxially such tool or work gear, a slide mounted with capacity for moving in a path transverse to that of said carriage, and a work holder supported on said slide and adapted to support rotatably a gear element in mesh with a gear element on said spindle, said holder and the gear element supported thereby being located so that the common perpendicular to the axes of the gear element and spindle is intermediate the ends of both intermeshing gear elements when the carriage is at an intermediate point in its path of travel, and the spindle holder being adjustably connected to the carriage for angular adjustment about an axis which coincides with said common perpendicular when the carriage is at said intermediate point.

3. A gear finishing machine comprising a base, a carriage movable back and forth on said base in a fixed path, a slide movable back and forth on the base in a path intersecting the path of said carriage, supporting means on said carriage and slide respectively adapted to hold rotatably a gear to be finished and a gear-like finishing tool respectively, in mesh with one another with their axes non-parallel and non-intersecting, means for reciprocating said carriage between fixed limits, an abutment for said slide arranged to retain the slide in a given position relative to the path of the carriage during the operative traverse of the carriage, and adjusting means on the slide adapted to vary the position of the supporting means on the slide with respect to the path of the supporting means on the carriage.

4. A gear finishing machine comprising a base, a carriage movable back and forth on said base in a fixed path, a slide movable back and forth on the base in a path intersecting the path of said carriage, supporting means on said carriage and slide respectively, one of said means being adapted to hold rotatably a gear to be finished and the other to hold rotatably a gear-like finishing tool, in mesh with one another with their axes non-parallel and non-intersecting, means for reciprocating said carriage between fixed limits, and automatic means for moving the slide in its before mentioned path so as to bring the gear-like elements into full mesh at the commencement of the travel of the carriage in one direction, said means having provisions for causing withdrawal of the slide at the end of such travel in the opposite direction.

5. A gear finishing machine comprising a base, a carriage and a slide movably mounted on the base and guided to move in intersecting paths, a spindle held by the carriage and protruding across the nearer end of the slide, adapted to hold a gear-like finishing tool or a work gear on its protruding part, means on the slide for supporting a conjugate work gear in mesh with such tool, or a gear-like tool in mesh with a work gear on the spindle, automatic means for reciprocating the carriage, a cam engaged with the slide for imparting movement thereto in its path, and automatic means for rotating the cam in time with the reciprocations of the carriage.

6. A machine as set forth in claim 5 in which said cam is provided with means for advancing the slide at the commencement of the travel of the carriage in one direction, and for retracting the slide when the carriage returns to the starting point.

7. A machine as set forth in claim 5, in which the cam is provided with means for effecting a progressive movement of the slide first in one direction and then in the opposite direction during the travel of the carriage.

8. A gear finishing machine as set forth in claim 5, and comprising adjusting means between the slide and cam for altering the position of the slide in its path of movement.

9. A gear finishing machine as set forth in claim 5, and in which the cam is constructed to effect continuing movement of the slide during the travel of the carriage.

10. In a gear finishing machine, a base, a slide engaged with said base with provision for movement in a definite path, a cam organized to move the slide in said path, a cam follower connected with the slide in engagement with the cam, adjusting means for effecting relative movement between the slide and cam follower whereby to alter the position of the slide in its path, a holder secured to the slide and a carrier rotatably mounted in said holder.

11. In a machine for finishing gears, a supporting structure having rectilinear guiding means, a slide or carriage engaged with said guiding means and constrained thereby to move in a fixed path, automatic means for reciprocating said carriage in such path, a holder secured to the carriage, a spindle rotatably mounted in said holder and protruding therefrom, the holder being mounted on the carriage with provision for angular adjustment about an axis transverse to both the spindle and the path of movement of the carriage and intersecting the protruding portion of the spindle, and a work or tool holder mounted on said supporting structure having provisions to mount a tool or work gear rotatably and located with the axis of rotation of such tool or work gear non-intersecting and non-parallel to the axis of said spindle.

12. A machine for finishing gears comprising a supporting structure having a guideway, a carriage slidingly engaged with said guideway and constrained thereby to move in a definite path, a holder secured to the carriage with provision for angular adjustment relatively thereto, a spindle rotatably mounted in said holder adapted to carry and rotate a gear-like tool or a work gear, a motor in driving connection with said spindle mounted on the holder, and means for reciprocating the carriage including a rotating shaft, a crank pin secured to said shaft and a connecting rod between the crank pin and carriage, the crank pin being adjustable to positions at different distances from the axis of said shaft whereby to vary the length of travel imparted to the carriage, and means for supporting rotatably a work gear or a gear-like tool in mesh with the tool or gear, respectively, carried by said spindle, and with its axis parallel to a line intersecting the axis of the spindle.

13. A machine for finishing helical or straight toothed internal or external gears by the action of a conjugate helical or straight toothed external or internal gear-like tool by intermeshing action of the gear and tool or non-intersecting axes inclined correspondingly to the difference in helix angles between the teeth of such gear and tool; comprising a carriage guided to reciprocate in a given path, a spindle holder, a spindle rotatably mounted in said holder and projecting therefrom, adapted to carry on its projecting portion a tool or a gear of the character set forth, the holder being adjustably secured to the carriage with provision for adjustment about an axis intersecting the axis of the spindle with a range sufficient to place the spindle parallel to the path of movement of the carriage, and at various angles to such path, a supporting table adjacent to the protruding part of said spindle and at one side thereof, and a holder mounted on said table adapted to support rotatably a gear to be finished or a gear-like tool conjugate to the tool or gear respectively on the spindle, said table having provisions for supporting different holders interchangeably in positions where the axis of the gear or tool is parallel or inclined respectively to the path of movement of the carriage, but neither coincides with nor intersects the axis of the spindle, and the tool and gear are caused to mesh with one another.

14. A gear finishing machine comprising rotatable holders adapted to carry respectively a gear-like finishing tool and a gear to be finished, a tool mounted on one of said holders having teeth conjugate to the gear to be finished when meshed therewith in a location such that the axes of tool and gear neither coincide nor intersect nor are parallel to one another, the tooth faces of said tool being bowed longitudinally and symmetrically with respect to their longitudinal median lines sufficiently to make extended contact lengthwise with the tooth faces of the gear to be finished when so meshed, means for supporting said holders in positions so related that the tool and gear are held in mesh with their axes inclined to one another and non-intersecting, and means for driving one of said holders rotatably.

15. A gear finishing machine as set forth in claim 14 and including further means for reciprocating the tool holder in the direction of the axis of the gear to be finished.

16. A gear finishing machine comprising a supporting structure, a spindle and a holder rotatably mounted on said supporting structure to rotate about axes each parallel to a line obliquely intersecting the other, a tool in the form of an external gear mounted on said spindle and having teeth conjugate to the teeth of an internal gear coaxial with said holder, the side faces of said tool teeth being longitudinally convex so as to make extended lengthwise contact with the teeth of said gear, and means for rotating the spindle.

17. A machine for finishing internal gears which comprises a holder adapted to support such a gear rotatably with provision for meshing with an external gear, a tool in the form of an external gear conjugate to such internal gear when located with its axis inclined to the axis of the work gear and in a different plane therefrom and in mesh with the gear, a rotatable work spindle on which said tool is coaxially mounted, and provisions for relatively adjusting said holder and spindle to bring them into position for effecting crossed axis mesh between the tool and internal gear; the teeth of the tool having longitudinally convex face curves of greater convexity than that which suffices to cause uniform bearing on the mating teeth of the work gear throughout the common length of the intermeshing teeth.

18. A gear finishing machine comprising rotary holders adapted to support rotatably a tool in the form of an external gear and an external work gear respectively, said holders being located with their axes inclined to one another but in different planes, a tool mounted on one of said holders having teeth conjugate to the teeth of an external gear mounted on the other holder and its tooth faces being longitudinally concave on opposite sides with curvatures sufficient to effect extended bearing lengthwise on the mating teeth of the work gear, and means for rotating one of said holders.

19. A gear finishing machine comprising rotary holders adapted to support rotatably a tool in the form of an external gear and an external work gear respectively, said holders being located with their axes inclined to one another but in different planes, a tool mounted on one of said holders having teeth conjugate to the teeth of an external gear mounted on the other holder and its tooth faces being longitudinally concave on opposite sides with curvatures sufficient to effect extended bearing lengthwise with the work gear teeth, but of less concavity than that which would effect uniform bearing throughout the entire common length of such mating teeth, and means for rotating one of said holders.

20. A machine for finishing gears by the action of a gear-like tool conjugate to the gear to be finished and running in mesh therewith when the axes of said gear and tool are non-parallel and non-intersecting, comprising a base, a carriage mounted on the top of said base to reciprocate crosswise thereof, a spindle supported rotatably by said carriage and protruding at one end therefrom from the side of the base, having provisions for mounting such tool or gear on its protruding end, a slide mounted on the side of the base from which the spindle protrudes with provisions for movement up and down in a path crossing the protruding end of the spindle, rotatable means supported on said slide and adapted to hold rotatably a gear to be finished or a tool in mesh with the tool or gear respectively on the spindle, the axis of said rotatabl holding means being displaced from the axis of the spindle along the path of the slide in a position such that said axes neither intersect nor coincide, and a rigid abutment for the slide maintaining a prescribed distance between said axes during traverse of the carriage.

EDWARD W. MILLER.